United States Patent
Wallstedt et al.

[11] Patent Number: 5,903,834
[45] Date of Patent: *May 11, 1999

[54] DISTRIBUTED INDOOR DIGITAL MULTIPLE-ACCESS CELLULAR TELEPHONE SYSTEM

[75] Inventors: Yngve Kenneth Wallstedt, Solna; Bo Gösta Hedberg, Kista; Anders Börje Forsèn, Täby; John Tomas Robert Dannelind, Solna; Carl Magnus Frodigh, Kista; Carl Fredric Ulf Kronestedt, Stockholm, all of Sweden

[73] Assignee: Telefonaktiebolaget L/M Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/540,326

[22] Filed: Oct. 6, 1995

[51] Int. Cl.$^6$ .................................................. H04Q 7/20
[52] U.S. Cl. .......................... 455/422; 455/503; 455/442
[58] Field of Search .................... 455/33.1, 33.4, 455/54.1, 56.1, 33.2, 53.1, 51.1, 422, 442–444, 502, 503, 517, 524–525, 562, 132, 445; 379/59, 60

[56] References Cited

U.S. PATENT DOCUMENTS

| | | | |
|---|---|---|---|
| 4,355,399 | 10/1982 | Timor | 375/1 |
| 4,932,049 | 6/1990 | Lee | 379/60 |
| 4,968,966 | 11/1990 | Jasinski et al. | 340/825.44 |
| 5,025,485 | 6/1991 | Csongor et al. | 455/103 |
| 5,088,108 | 2/1992 | Uddenfeldt et al. | 375/12 |
| 5,095,531 | 3/1992 | Ito | 455/33 |
| 5,109,528 | 4/1992 | Uddenfeldt | 455/33.2 |
| 5,191,598 | 3/1993 | Bäckström | 375/100 |
| 5,327,577 | 7/1994 | Uddenfeldt | 455/33.2 |
| 5,355,515 | 10/1994 | Sicher | 455/33.2 |

(List continued on next page.)

FOREIGN PATENT DOCUMENTS

| | | |
|---|---|---|
| 0 368 673 A1 | 11/1988 | European Pat. Off. |
| A-0 368 673 | 5/1990 | European Pat. Off. |
| 0 497 409 A2 | 8/1992 | European Pat. Off. |
| WO 94/10792 | 5/1994 | WIPO |
| WO-A-94 10792 | 5/1994 | WIPO |
| WO 94/28690 | 12/1994 | WIPO |
| WO-A-94 28690 | 12/1994 | WIPO |
| WO 95/05722 | 2/1995 | WIPO |

OTHER PUBLICATIONS

Andresen et al., *SKINFAKSE*, Vehicle Navigation & Information Systems, Sep. 2–4 1992 Oslo, Norway, pp. 455–460.

Ulf Hagström and Håkan Djuphammar; "*RBS 884 A New Generation Radio Base Stations for the American Standard*"; Ericsson Review, No. 1, 1994, pp. 4–13.

Lise Olaussen and Erik Helli; "*Vehicle Navigation & Information Systems*"; Conference Record of Papers presented at 3rd Vehicle Navigation & Information Systems Conference, Sep. 2–4, 1992, Oslo, Norway; pp. 455–460.

*Primary Examiner*—Andrew I. Faile
*Assistant Examiner*—Vincent F. Boccio
*Attorney, Agent, or Firm*—Jenkens & Gilchrist, P.C.

[57] ABSTRACT

A communication network, and associated method, permitting wireless communication with a mobile unit in an indoor environment. Transceivers are positioned at spaced-apart locations and are coupled to a centralized, control device. The transceivers include transmitter portions and wideband receiver portions. Uplink signals transmitted by a mobile unit are received by receiver portions of transceivers within the range of the uplink signal. Downlink signals are generated by at least two transmitter portions of at least two transceivers. The control device controls selection of which transmitter portions and which receiver portions of the plurality of transceivers are utilized to effectuate two-way communication with the mobile unit. Control signals can also be transmitted by the transmitter portions of all of the transceivers such that a mobile unit positioned anywhere within the area of the communication network receives the control signals.

27 Claims, 7 Drawing Sheets

U.S. PATENT DOCUMENTS

| | | | |
|---|---|---|---|
| 5,404,573 | 4/1995 | Yabe et al. | 455/33.1 |
| 5,428,816 | 6/1995 | Barnett et al. | 455/33.2 |
| 5,442,680 | 8/1995 | Schellinger et al. | 379/58 |
| 5,481,532 | 1/1996 | Hassan et al. | 370/16 |
| 5,483,668 | 1/1996 | Malkamaki et al. | 455/33.2 |
| 5,546,443 | 8/1996 | Raith | 379/59 |

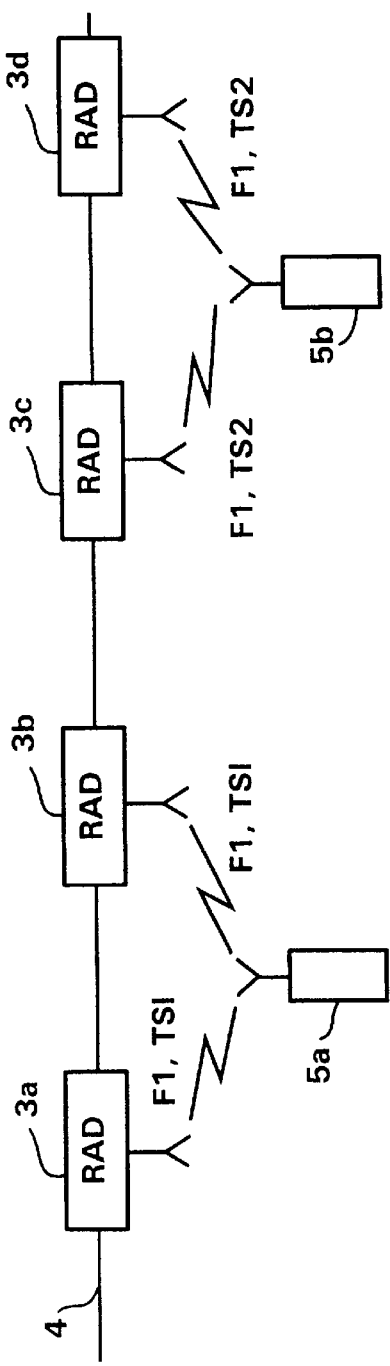
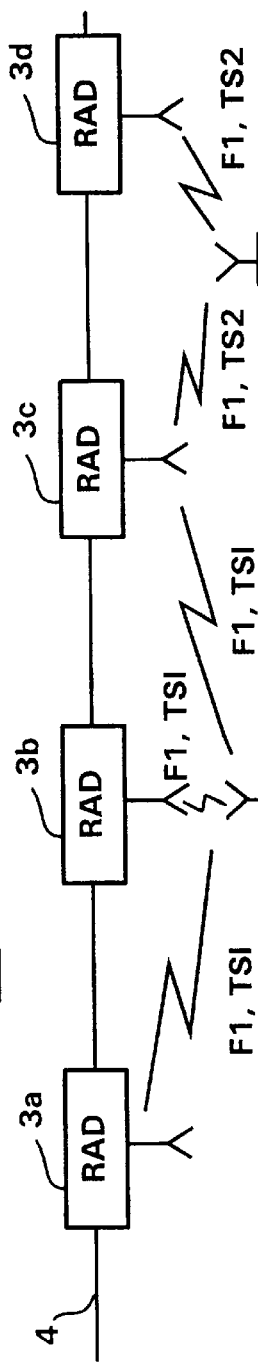
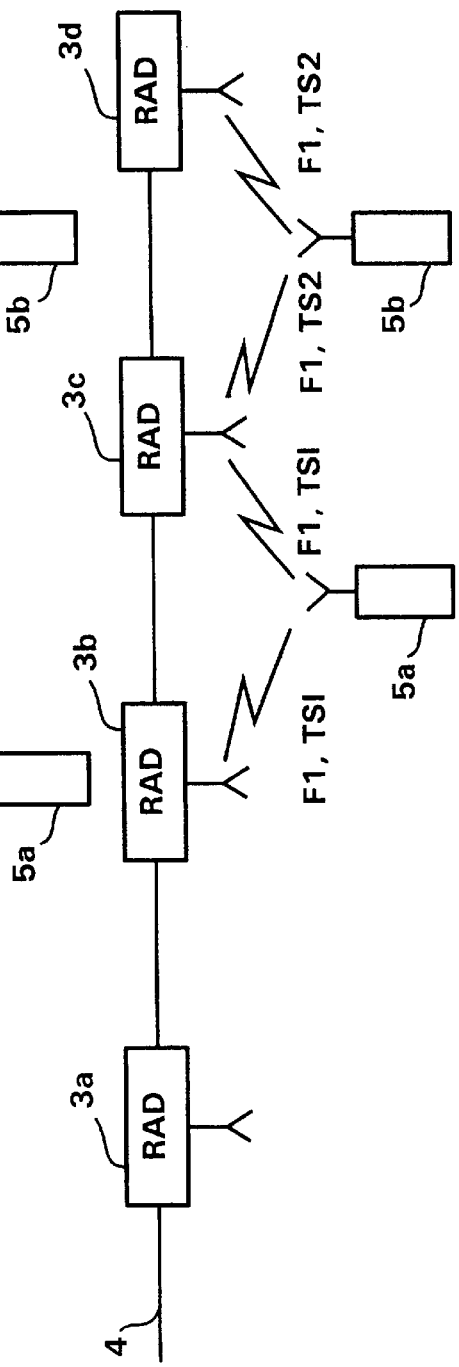
FIG. 6A
FIG. 6B
FIG. 6C

DISTRIBUTED INDOOR DIGITAL MULTIPLE-ACCESS CELLULAR TELEPHONE SYSTEM

The present invention relates to the field of cellular communication systems and, more specifically, to a distributed, cellular telephone system adapted for indoor use.

BACKGROUND OF THE INVENTION

Indoor cellular systems are confronted with a challenging radio propagation environment. The penetration of radio waves is hindered by walls and doors which may define irregular boundaries; numerous obstacles exist such as pipes and ducts which shadow or otherwise restrict radio propagation, and so forth. Serving mobile terminals located inside an office building by means of an outdoor cellular radio base station is usually impractical. While the signal may be able to penetrate exterior walls and windows, the radio signal may not penetrate well into interior spaces.

As a result, efforts have been made to address the particular needs of indoor cellular coverage. A substantial portion of these efforts has been focused around the so-called micro-cell, which is in effect a fully functional cellular base station designed to cover cell sizes on the order of tens or hundreds of square meters.

As with ordinary outdoor macro-cellular systems, each cell in a micro-cellular system may be assigned a group of frequencies. As a mobile terminal moves from one cell to the next, the terminal is handed-off between neighboring micro-cells. The hand-offs are based on received signal strength measurements which are monitored and controlled by a central switch. When the signal strength falls below a predetermined threshold, the terminal is instructed to retune its transceiver to another frequency used by another cell. Various hand-over methods based on received signal strength measurements are known to those skilled in the art.

When the cell size of the micro-cell becomes so small that a user walking down a corridor moves through several cells during a conversation, the number of hand-offs increases substantially, creating a substantial network management problem. One solution to this problem is not to perform a hand-over in the conventional sense, but to keep the terminal operating on the same frequency/time slot combination and to hand-over the downlink from one micro-cell to another.

Such a technique is described in U.S. Pat. No. 4,932,049 entitled "CELLULAR TELEPHONE SYSTEM." Therein is described a system comprising a plurality of contiguous cells each assigned a particular frequency set and having transmitting and receiving means, which are arranged for maintaining continuous communication with mobile terminals moving from cell to cell. Each cell has a plurality of transmitting and diversity receiving sets, or micro-cells positioned at a respective antenna site at the periphery of the cell and configured so that the propagation and reception of signals is limited to substantially the borders of the cell. Control circuitry monitors the strength of each signal received by each of the antenna sites at each frequency channel in the assigned frequency set. Transmission, at each frequency channel in the assigned set, is confined to the antenna set at one sub-site in the cell having the strongest received signal at each frequency.

When a mobile unit moves such that the received signal strength at a subsite other than the one currently transmitting becomes strongest, the system operates to turn off the transmitter at the weaker site and turns on the transmitter at the sub-site at which the stronger signal level is being received. This is known as a so-called virtual handover. Two diversity receiving antennas are also switched to the proper sub-site to receive the call. The frequency does not change and remains as before. Thus the MTSO is not involved and no additional hand-off load is encountered.

One problem with such a system is that the broadcast control channel is transmitted from a single sub-site which covers the entire cell, in an indoor system where sub-sites may be located around corners—or even inside of elevators—the broadcast control channel may not penetrate where the sub-sites are located. Loss of signal to the broadcast control channel leaves the mobile station without essential overhead information. Usually, loss of the broadcast control channel is perceived by the mobile station as a complete loss of signal and forces the mobile station into a reacquisition mode.

A second problem typically associated with micro-cellular systems is that there is little or no time dispersion of signals transmitted within such a system. Time dispersion arises when a reflected signal of significant magnitude arrives delayed in time from the main signal. When the time delay is on the order of the symbol time, intersymbol interference results. Historically, time dispersion has been an undesirable side-effect of radio propagation. However, modern techniques such as MLSE equalization actually advantageously make use of time dispersion to enhance signal reception. Creating time dispersion or the use of macro-diversity have been employed in outdoor cellular and land mobile radio systems such as described in U.S. Pat. No. 5,088,108 entitled "CELLULAR DIGITAL MOBILE RADIO SYSTEM AND METHOD OF TRANSMITTING INFORMATION IN A digital CELLULAR MOBILE RADIO SYSTEM" and U.S. Pat. No. 5,109,528 entitled "HANDOVER METHOD FOR A MOBILE RADIO SYSTEM" both assigned to the instant assignee of the present invention. However, in an indoor system the combined problem of macro-diversity and virtual handover has not been heretofore addressed.

A third problem typically associated with conventional micro-cellular based indoor systems is that both the uplink and downlink are normally served from the same antenna set. When the downlink antenna is selected so is the uplink antenna. This is because existing micro-cellular systems employ narrowband radio receivers. If a wideband radio receiver is used there is no need to restrict reception to a particular antenna set of the signals received from a mobile station. In a non-stationary environment, the uplink and downlink may not be temporally reciprocal and thus it would be advantageous to separately select the uplink and downlink antenna sets. Viz., because the uplink and downlink are at different frequencies, the uplink and downlink channels exhibit different characteristics, such as different levels of Rayleigh fading, etc.

SUMMARY OF THE INVENTION

It is therefore an object of the present invention to provide a cellular system adapted for indoor use which overcomes the limitations of the existing art.

In one embodiment of the present invention, a plurality of transceivers are positioned throughout an area. The transceivers are all coupled to a centralized control device, and the control device controls operation of the transceivers. At least two transceivers transmit downlink signals to the mobile unit. As the mobile unit passes between subcells, the mobile unit continues to receive a downlink signal without changing the mobile unit's downlink channel. Control signals are transmitted by all of the transceivers, and a mobile unit located at any position throughout the area is able to detect control signals transmitted thereupon. The transceivers further advantageously include wideband receiver portions, tunable concurrently to all of the uplink channels upon which the mobile unit is capable of transmitting signals. Because of such wideband reception and control of the transceivers by a centralized control device, transmitter portions of one transceiver and receiver portions of another transceiver may be utilized to provide two-way communication with the mobile unit.

In accordance with the present invention, therefore, a communication network, and an associated method, permits wireless communication with a mobile unit movably positionable to a selected location within at least one cell. The cell is defined by an area encompassed by the network. A plurality of spaced-apart transceivers selectively transmit downlink signals on a selected downlink channel to the mobile unit tuned to the selected downlink channel. Each transceiver of the plurality defines a subcell and subcells defined by the transceivers collectively form the at least one cell. A control device is coupled to each transceiver of the plurality of transceivers. The control device controls operation of the transceiver such that at least two transceivers defining adjacent subcells transmit downlink signals on the selected downlink channel to the mobile unit. The mobile unit is permitted uninterrupted reception of the downlink signal by remaining tuned to the selected downlink channel as the mobile unit is moved between the adjacent subcells.

These and other features and advantages of the present invention will be readily apparent to one of ordinary skill in the art from the following written description when read in conjunction with the drawings in which like reference numerals refer to like elements.

BRIEF DESCRIPTION OF THE DRAWINGS

An exemplary embodiment of the invention will now be described in more detail with reference to the accompanying drawings, in which like descriptive labels are used to refer to similar elements:

FIGS. 6A–6C are schematic illustrations illustrating soft hand-over with macro-diversity.

DETAILED DESCRIPTION OF THE INVENTION

In the following description, for purposes of exposition and not limitation, specific details are set forth, such as particular circuits, circuit components, techniques, etc. in order to provide a thorough understanding of the invention.

However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

System Architecture

Figure 1:
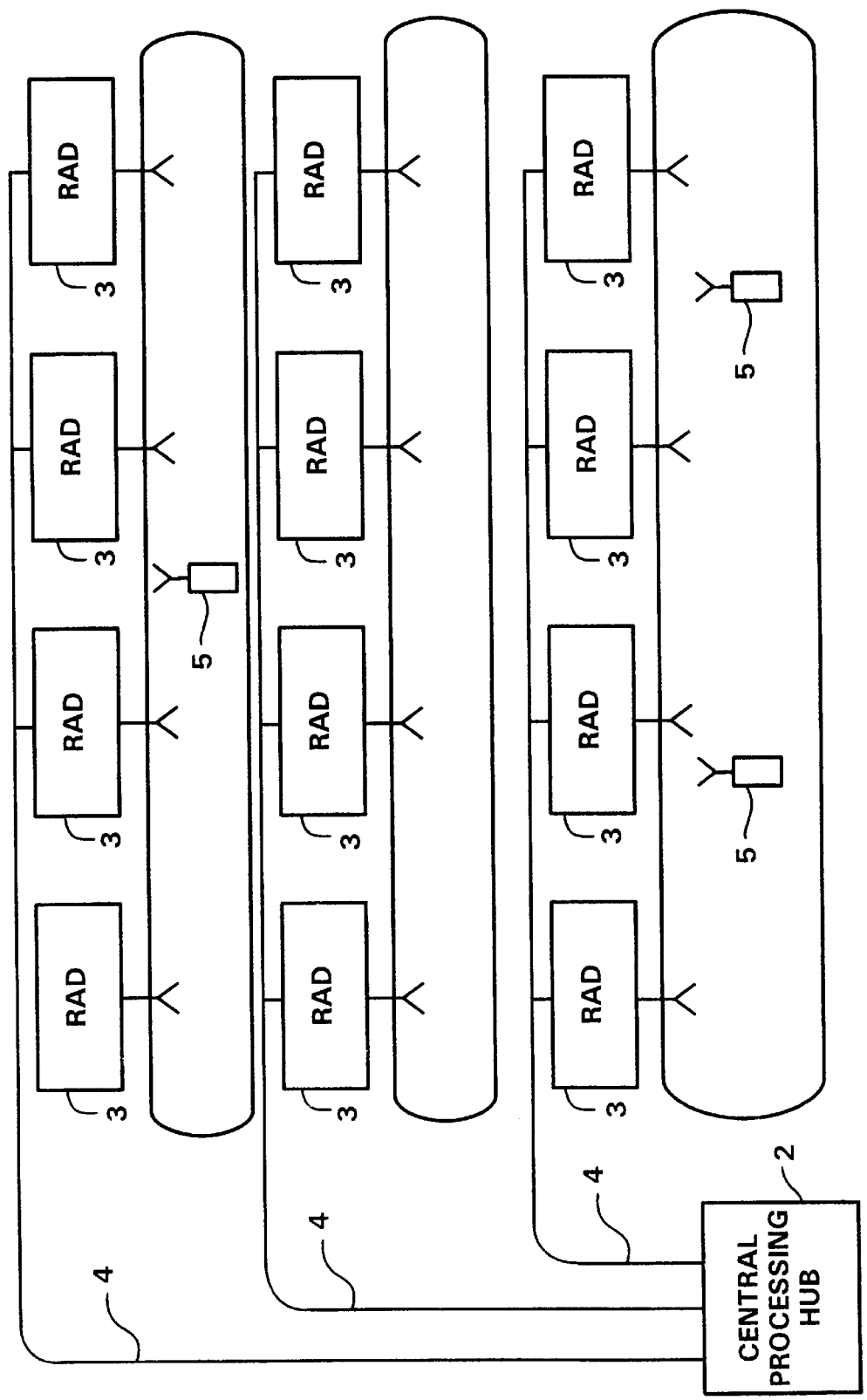
FIG. 1 is a schematic illustration of a cellular communications system according to an embodiment of the present invention.

Referring now to FIG. 1, a first embodiment of a cellular telephone system in accordance with the present invention is schematically illustrated. The exemplary system schematically illustrated in FIG. 1 has three cells. The cells may be partially overlapping. In a practical system, there may be as few as one cell or as many as hundreds of cells. However, for clarity and brevity of description the exemplary system shown in FIG. 1 includes three cells. Within each cell 1A, 1B, and 1C, there are a plurality of remote antenna devices 3 (RADS) which together provide the radio coverage defining the boundary of the cell. The RADs 3 are connected through an interface link 4 to a central processor, or HUB 2. As will be described hereinafter in greater detail, HUB 2 serves as the central signal processing unit for the system and provides a means for distribution of the traditional functionality of a base station transceiver. HUB 2 comprises and concentrates many of the signal processing functions heretofore performed in a base station, or micro-cell transceiver, and makes way for the use of RADs instead of more conventional micro-cell transceivers.

Cell Structure

Figure 2:
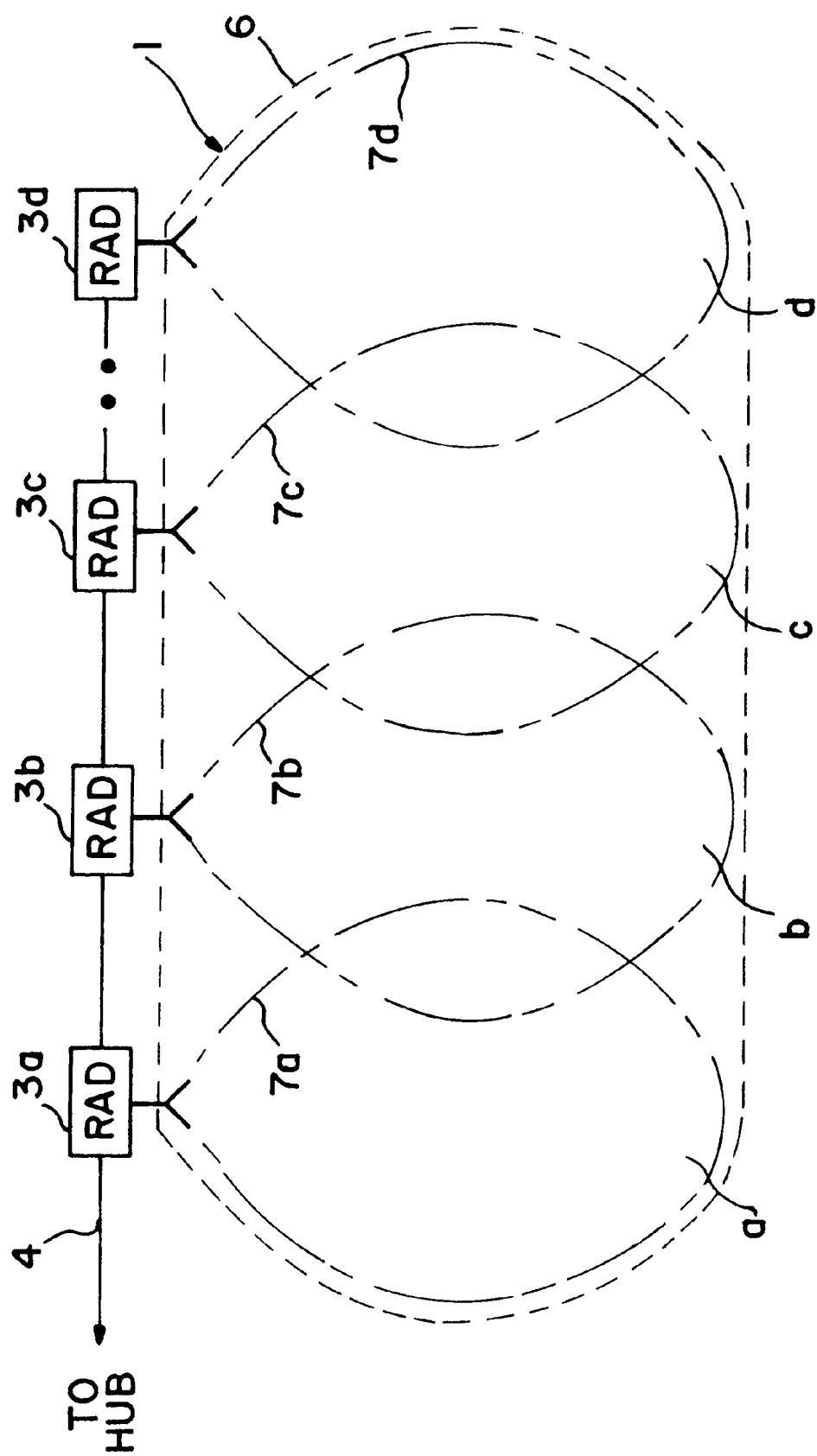
FIG. 2 is a schematic illustration of a cell according to an embodiment of the present invention.

Referring now to FIG. 2, a single cell 1 is illustrated. The outer boundary 6 of the cell is delineated by a dotted line. The cell boundary 6 shown in FIG. 2 is exemplary. As is obvious to those skilled in the art, the peculiarities of radio propagation in a physical environment often produce a cell boundary which is irregular and not necessarily contiguous. The cell boundary 6 is intended to illustrate the location at which a mobile station 5 moves from the influence of one cell to an adjacent cell and not an actual physical representation.

Within cell boundary 6, there are a plurality of smaller regions of coverage, or subcells, each of which provides radio coverage within a portion of cell boundary 6. For the purpose of exposition, there are four such subcells illustrated in FIG. 2 identified by the descriptive labels a, b, c, and d. The boundaries of the subcells a, b, c, and d are delineated by the regions shown by dashed lines 7a, 7b, 7c and 7d respectively. Although only four subcells are shown, there may be any number N, where N is an integer number greater than or equal to 2, of subcells defining cell 1.

The boundaries of each subcell are defined by the radiation patterns of the corresponding RAD 3. For example, subcell a is defined by the radiation pattern of RAD 3a, subcell b is defined by the radiation pattern of RAD 3b, and so forth. As the subcells are shown in FIG. 2, the subcell boundaries are the same for the receive and transmit antennas of each RAD. This assumption is made for clarity of the detailed description and is not required, as shall be noted below.

The Channelized RAD

RAD 3 provides the translation between signals received from HUB 2 and the radio signals broadcast and received in each subcell a, b, c, and d. RAD 3 may interface to HUB 2 using analog signals but because of the limited dynamic range of an analog interface, a digital interface is sometimes preferred. Previously, a digital interface also suffered from degraded performance due to the limited dynamic range of analog-to-digital (A/D) and digital-to-analog (D/A)

converters, but advances in A/D and D/A technology have improved such that a digital interface can be practically employed.

Figure 3:
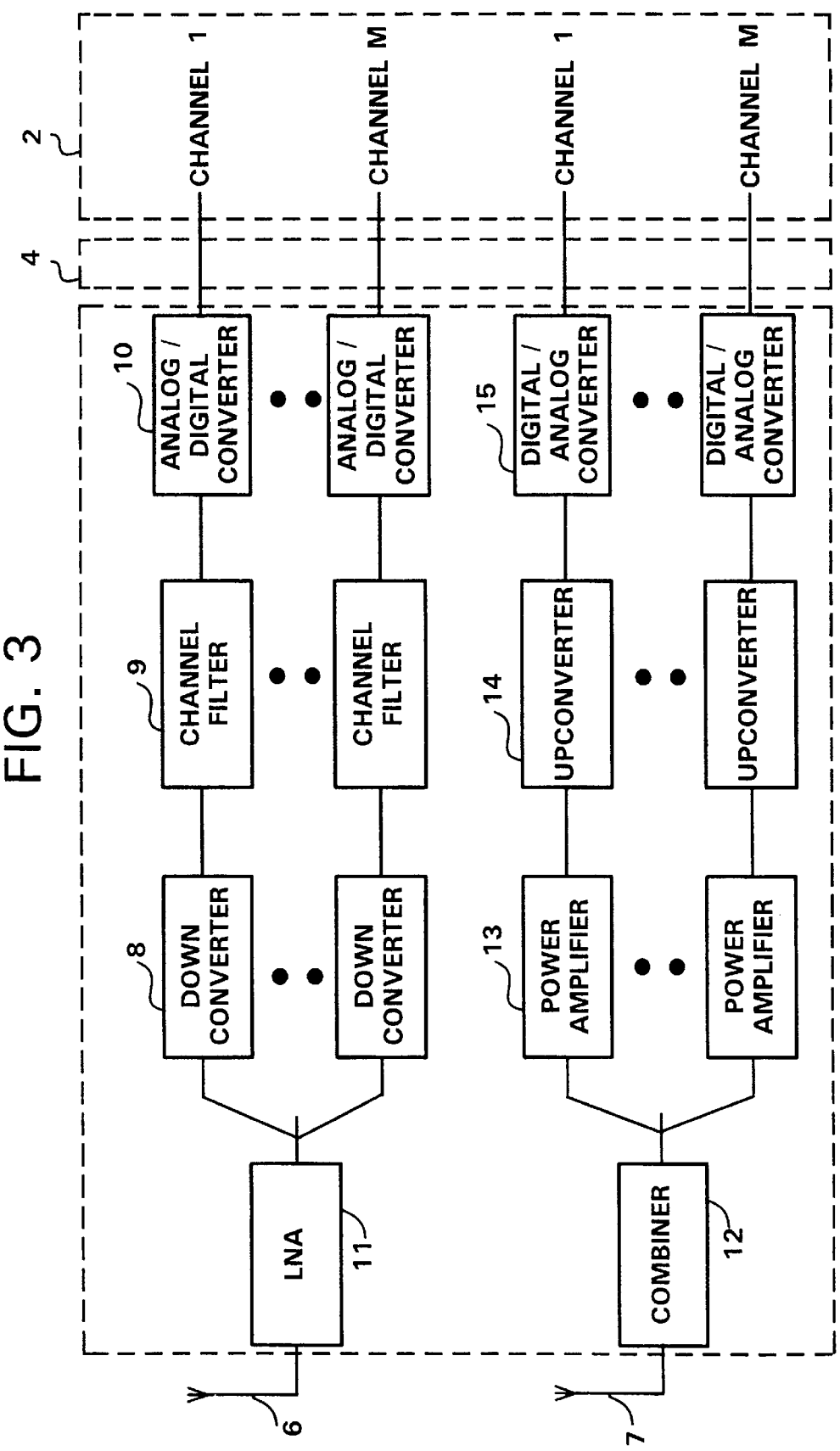
FIG. 3 is a schematic illustration of a channelized remote antenna device according to one embodiment of the present invention.

A first embodiment of RAD 3 is illustrated in greater detail in FIG. 3. RAD 3 is a transceiver meaning that both transmit and receive functions are provided. On the receive side, signals received by antenna 6 are coupled to a low noise amplifier (LNA) 11 which boosts the received signal sufficiently to overcome the noise added by down conversion. The output of the LNA 11 is coupled to a plurality of down converters 8. The down converters 8 convert the RF signal to an intermediate frequency (IF) signal according to conventional methods. The IF signal is a lower frequency signal than the RF signal and is easier to process than the corresponding RF signal. The IF signal is coupled to channel filter 9 which may be a crystal band-pass filter that selectively passes only the frequency band of interest and attenuates frequencies outside of this band. Channel filter 9 may also provide anti-aliasing filtering. The filtered IF signal is coupled to A/D converter 10 which produces a digital IF signal. The digital IF signals are coupled via interface link 4 to HUB 2.

On the transmit side, digital IF signals received from HUB 2 are coupled to D/A converters 15 where they are converted to analog IF signals. The analog IF signals are coupled to up converters 14 where they are frequency translated to RF signals. The RF signals are amplified in power amplifiers 13. The RF signals are combined in combiner 12 and transmitted via transmit antenna 7. In the RAD illustrated schematically in FIG. 3, A/D and D/A conversion is done on a per-channel basis. That is, each channel, or frequency band, requires its own separate RF/IF chain. This is referred to as a channelized RAD. A channelized RAD has the advantage that the A/D and D/A converters are of relatively modest complexity and cost.

New technology in the form of 12 bit, 40 megasample/second converters is available that enables A/D and D/A conversion of wideband multicarrier signals with 80–100 dB dynamic range. According to an alternative embodiment, a wideband RAD may be constructed from such converters as is illustrated schematically in FIG. 4. Although such high performance A/D and D/A converters are quite expensive, the fact that only one A/D and D/A per RAD is required independent of the number of channels needed in the RAD makes a wideband RAD economically feasible.

Figure 4:
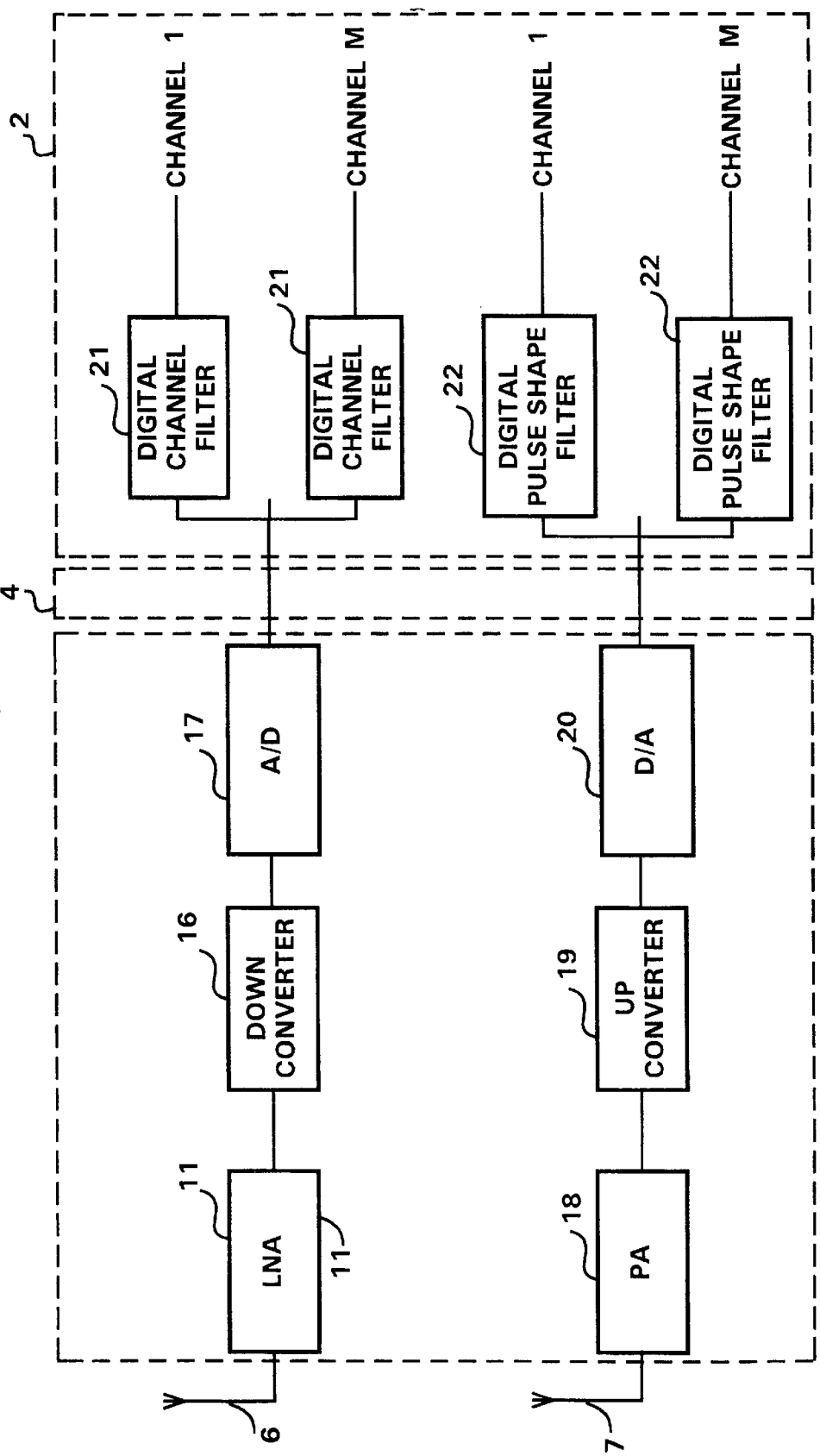
FIG. 4 is a schematic illustration of a wideband remote antenna device according to a second embodiment of the present invention.

Referring now to FIG. 4, on the receive side, signals received via receive antenna 6 are coupled to LNA 11 where the RF signals are amplified sufficiently to overcome the noise introduced during down conversion. The output of LNA 11 is coupled to down converter 16 which produces a wideband IF signal. The wideband IF signal is coupled to A/D converter 17. Anti-aliasing filtering (not shown) may be performed prior to A/D conversion. The output of the A/D converter 17 is a high-speed digital IF Bitstream which is coupled via interface link 4 to HUB 2.

On the transmit side, the high speed digital IF Bitstream received from HUB 2 via interface link 4 is coupled to D/A converter 20 which produces a wideband analog IF signal. The wideband analog IF signal is coupled to up converter 19 which frequency translates the wideband analog IF signal to a wideband RF signal. The output of up converter 19 is coupled to multicarrier power amplifier 18. The amplified wideband RF signal is coupled to antenna 7 and radiated within the subcell.

A wideband RAD offers many advantages with regard to system architecture and performance and therefore advantageously forms a portion of the cellular telephone system of another embodiment of the present invention.

The Interface Link

Interface link 4 is a bi-directional serial interface which carries the digitized IF as well as control and overhead information between HUB 2 and RADs 3. Depending on the RAD architecture, the date rate may vary between 10 and 250 Mbit/s. Although data rates as high as 250 Mbits/s can be sent over a coaxial cable, an optical link can alternately be utilized in embodiments of the present invention.

Interface link 4 uses a full star topology using two-fiber links. With present technology, the two-fiber solution is more cost effective than a wavelength division multiplex solution. For cost minimization reasons a single mode fiber can be employed and fiber ribbon technology can be used for splicing. Use of preassembled cable terminations can also be used to save cost, installation time and ensure quality connections.

The HUB

HUB 2 is a central processor which performs many of the functions traditionally carried out by separate base stations, or micro-cells. Substantial cost savings and increased flexibility are effected by consolidating signal processing and radio network operation functions into a central processor.

Figure 5:
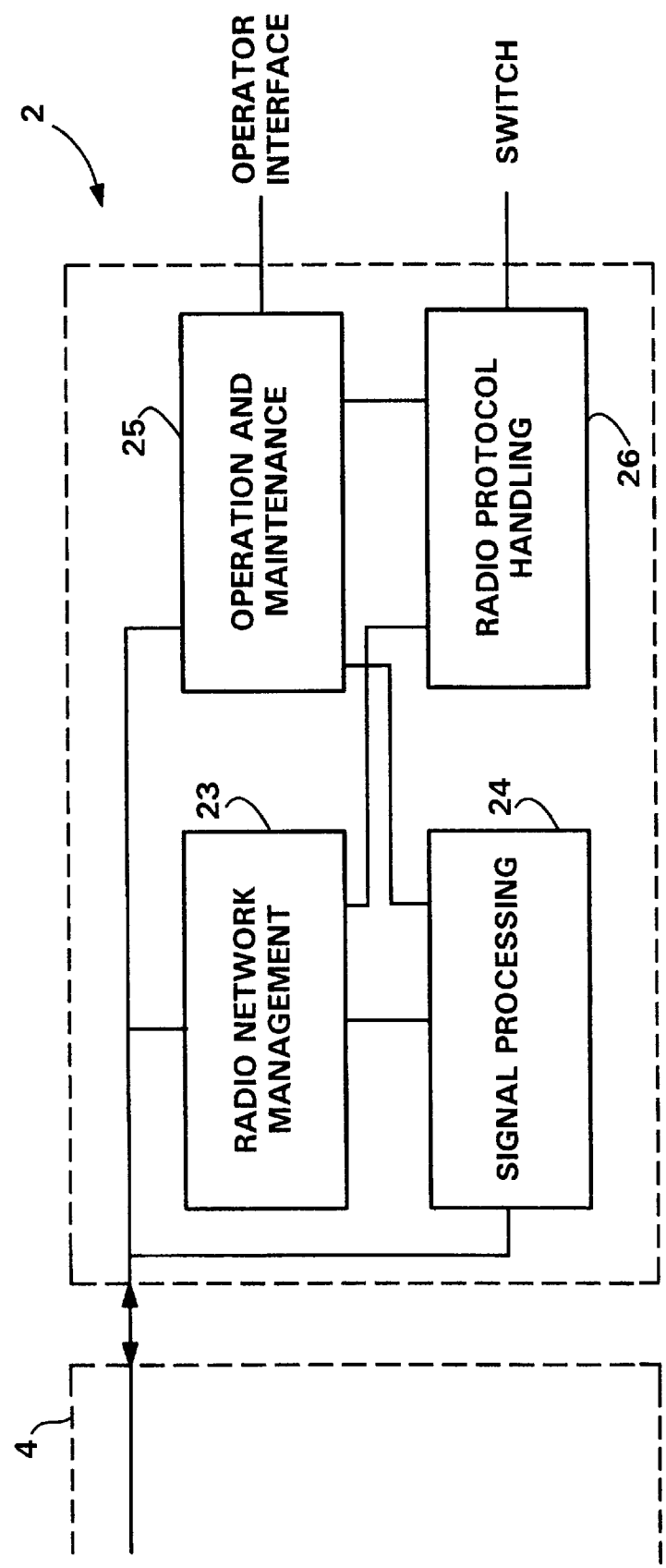
FIG. 5 is a schematic logical diagram of a HUB.

FIG. 5 schematically illustrates the logical architecture of HUB 2. The signal processing subsystem (SPS) 24 contains all of the baseband signal processing normally performed at the transceiver. These include: channelizing, switching, combining, and narrow band signal processing. Uplink measurements of signal strength (RSSI), signal quality (i.e., bit error rate, frame erasure rate, etc.) Are also performed in SPS 24 according to known techniques. Signal strength and/or signal quality measurements performed for each RAD 3 connected to the HUB 4 are reported to radio network management subsystem 23. SPS 24 also performs diversity combining such as described in U.S. Pat. No. 5,191,598 to Bäckström, et al., for example.

Radio network management subsystem (RNS) 23 is responsible for local control of the radio resources. RNS 23 controls handovers between RADs 3 and controls the switches on the receiver and transmitter side of SPS 24 for trunking efficiency gains.

Radio protocol subsystem (RPS) 26 serves as the link between SPS 24, RNS 23, and the outside network. The handling of higher protocol layers include communication with mobile station 5 for measurement ordering and interpretation.

The Signal Processing Subsystem

Figure 7:
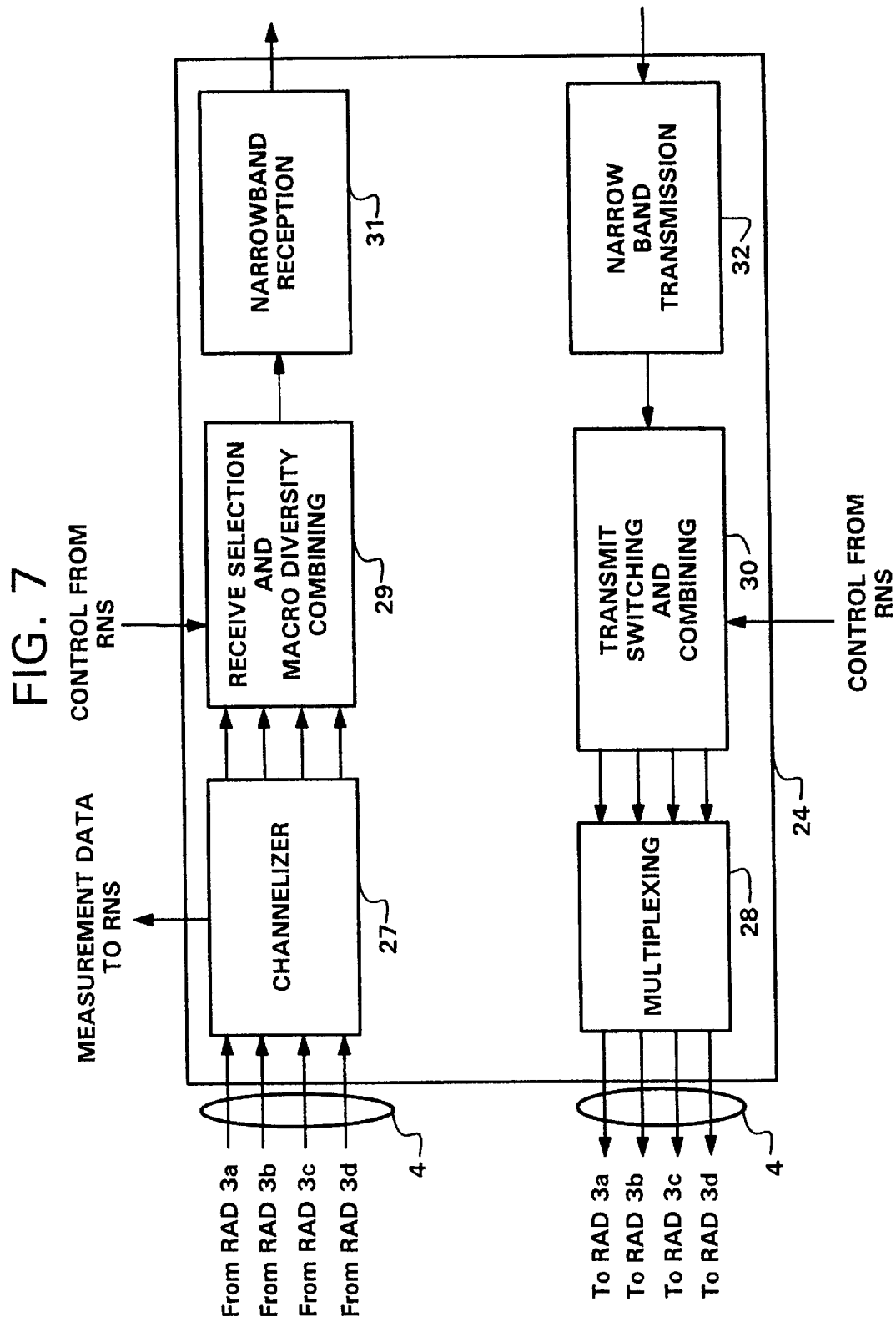
FIG. 7 is a schematic illustration of the signal processing subsystem which forms a portion of the HUB shown in FIG. 5.

The functions of SPS 24 are schematically illustrated in FIG. 7. Digitized IF signals received from RADs 3a–3d are coupled to channelizer 27 where they are digitally separated into discrete channels. For each channel and each RAD, RSSI, or other signal quality measurements are performed and output as measurement data to RNS 23. RNS 23 decides which channels from which RADs should be used and issues corresponding control information to the receive selection and macro diversity combining block 29. Block 29 performs diversity combining of the signals received on the appropriate channel from the appropriate RAD. The output of block 29 is coupled to narrowband receiver 31 which receives the combined signal according to known techniques.

On the transmit side, the measurement information from channelizer 27 is used by RNS 23 to select the appropriate control information to the transmit switching and combining block 30. All of the channels are multiplexed together in multiplexer 28 and the digitized IF is sent to RADs 3a–3d. So it is seen that while specific RAD sites are selected for downlink, all of the RAD sites are used for making uplink measurements. The use in the present invention of wideband RADs 3 and central processing in the HUB 2 allows for this unprecedented flexibility.

Unique ID Numbers and Automatic System Configuration

Via O&M 25 HUB 2 is capable of assigning identification parameters to RADs 3. This may be accomplished by polling the RADs and receiving authentication responses in return. The authentication information may include: type number, frequency range capacity, maximum/minimum transmit power level, antenna type, and so forth. This enables the O&M to determine automatically the system configuration without having to manually inform the HUB of the number of, or type of, RADs installed. Another feature of the present invention, is that the RADs are not preassigned a unique identification number, but rather are assigned a unique ID number, by the HUB 2 once installed in the system. This greatly simplifies system installation. HUB 2 periodically performs a system test which involves polling the RADs and receiving responses therefrom. During the initial set-up, the RADs are assigned unit ID numbers by O&M subsystem. Along with the unique ID numbers, other essential information about the RAD may also be stored in HUB 2. An advantage of this is that the system may be expanded, upgraded, or otherwise modified without manually reconfiguring the information in HUB 2. If, for example, a new RAD 3 is installed to provide coverage in a particular area, one simply connects the new RAD 3 to the interface link 4. HUB 2 will automatically recognize its presence, determine its essential information, and assign the new RAD a unique ID number. No special programming, or system set-up intervention is required by the user.

In another embodiment, when an additional RAD 3 is added to the network, the newly-added RAD 3 transmits signals by way of the interface 4 to the HUB 2. The signals provide the HUB 2 with an indication that the additional RAD 3 has been added to the network. The HUB 2 is thereby prompted to poll the additional RAD 3 and receive an authentication response in return. A unique ID number can thereafter be assigned by the HUB to the additional RAD, as described above.

Responsive to the authentication responses provided by the RADs to the HUB, the HUB is also able to prevent assignment of an ID number to a RAD or to revoke assignment of an ID number to a RAD responsive to its authentication response to polling by the HUB. Thereby, the HUB is able to control the configuration of the network.

Control Channel

Use of wideband RADs 3 provides freedom of network design compared to traditional micro-cell/pico-cell systems. With the wideband RAD 3, only a few cells are created as far as control/access channels are concerned thus greatly alleviating the network management problem. Referring back to FIG. 1, each cell is assigned one or more control channels which are broadcast by all RADs located in the cell. By simulcasting the control channel throughout the cell, the number of channels set aside to be used as control channels is substantially reduced as compared to a traditional cell approach. Further, the use of a simulcast control channel ensures that adequate coverage is provided throughout the cell.

Downlink Traffic Channels

Traffic channels are allocated per user (i.e., mobile station 5), rather than per cell, and follow the user to different RAD sites. Control of which RAD 3 sites are used is performed by HUB 2. Radio capacity can also be assigned most near the traffic on an as-needed basis.

Each RAD 3 has the ability to receive and transmit on any channel available to the system. A channel is defined as a frequency/time slot combination such as used in TDMA, or as frequency/code word combination such a used in CDMA. If there are N frequencies and M time slots/code words, then it is possible to allocate N number of frequencies and M time slots/code words to each RAD with the exception that all channels cannot be allocated to all RADs at the same time. Channel allocation and RAD selection are performed in HUB 2 by RNS 23. Based upon uplink signal measurements made in SPS 24 and reported to RNS 23, RNS 23 decides which RADs are best suited to serve a particular mobile station 5. Selection is made with consideration to reducing as much as possible the necessary downlink transmit power to achieve signal quality. This reduces overall system interference levels. Ostensibly, the nearest RADs are selected, but this is not always the case.

In assigning RADs for the downlink, macro diversity, similar to that described in U.S. Pat. No. 5,099,108, is provided. In macro diversity, radio signals having substantially the same information are broadcast from at least two RADs 3: one RAD transmits with a time delay with respect to another RAD. The time delay is of the order of the symbol period of the modulation such that inter-symbol interference (ISI) at mobile station 5 is produced. ISI can be exploited advantageously. If TDMA is used, a diversity combining MLSE equalizer, for example, as described in U.S. Pat. No. 5,191,598 to Backstrom, et al. If, alternatively CDMA is used, a RAKE receiver which performs space and time diversity combining is employed.

As the user (i.e., mobile station 5) moves within the cell, intra-cell hand-over, or inter-subcell handover takes place. In inter-subcell handover, the downlink is handed-off from one RAD to another without the mobile station 5 being aware that a handover has occurred. There is no change in frequency, time slot, or code word and the mobile continues to operate uninterrupted on the traffic channel as before. A hand-over is described in U.S. Pat. No. 5,109,528 to Uddenfeldt. U.S. Pat. No. 5,109,528 assigned to the instant assignee of the present invention is incorporated herein in its entirely by reference.

FIGS. 6A–6C illustrate one way in which hand-over is performed using macro-diversity. This is somewhat similar to so-called soft handover which is described in U.S. Pat. No. 5,109,528 to Uddenfeldt. Here, however, the mobile station receives signals from at least two RADs 3 all the time rather than just during the transition from one RAD 3 to another. Referring to FIG. 6A, mobile station 5A is receiving downlink signals on, for example, frequency F1 and on time slot, TS1, from RAD 3a and 3b. In an alternate embodiment, the mobile station 5A in a CDMA system receives the same DS-CDMA code words.

As shown in FIG. 6B, as mobile station 5A moves out of range of RAD 3a, mobile station 5A begins to receive downlink signals from RAD 3c. Note that RAD 3a, 3b, and 3c transmit substantially the same information, delayed in time to create ISI at mobile station 5A. As shown in FIG. 6C, as mobile station moves further towards RAD 3c, RAD 3a terminates transmission of its signal. Note that since neither the frequency, nor time slot change in TDMA (nor code word in CDMA), mobile station 5A is unaware of the handover. This reduces the network management task significantly.

Hand-off is controlled by HUB 2 which uses the RADs to periodically perform, uplink signal strength, or signal quality, measurements in the following manner. One advantage of using a wideband RAD is that each RAD receives all of the potential frequencies all of the time. In the traditional micro-cell/pico-cell approach, both the transmit and receive sites are switched at the same time. Since in a micro-cell/pico-cell the transmitter/receiver is usually collocated, this amounts to switching sites as the mobile station moves. In the present invention, only the downlink sites are changed: the RAD sites for uplink are unaffected since all of the RADs are receiving all of the uplink channels (i.e., frequencies/timeslots/codewords) all of the time. The digitized broadband signals from the RADs are coupled to HUB 2 via Interface link 4 and processed as in SPS 24.

Uplink Traffic Channels

In a conventional micro-cellular system, the uplink and downlink are coupled. That is, by selecting the downlink transmitter, the uplink receiver (normally colocated in a transceiver) is automatically selected as well. In the present invention, this is not necessarily the case. As previously mentioned, each RAD 3 is capable of receiving all channels all of the time. The uplink signals are received, down converted and digitized as described hereinabove and coupled to HUB 2 via interface link 4. In HUB 2 each channel from each RAD is analyzed to determine, for each channel, which of the received signals from the RADs should be demodulated. This information may be used to select the best RAD for the downlink as described hereinabove, but due to time varying characteristics of the radio environment, it is indeed possible that the received signals which are processed may come from RADs which did not transmit the downlink. In this manner, the uplink and downlink are effectively decoupled. Such decoupling has not heretofore been possible with existing micro-cellular solutions and represents a new flexibility in cellular system operation.

Micro-cellular/Macro-cellular Interaction

In an embodiment of the present invention, the mobile units which are operable in the above-described micro-cellular environment to send signals to and to receive signals from the RADs 3 are also operable in an alternate cellular system, such as a macro-cellular environment. When the mobile unit is positioned proximate to a micro-cellular system, the energy levels of the control (and other) signals generated by the micro-cellular system, when received by the mobile unit, can be significantly higher than the energy levels of the control (and other) signals received from the macro-cellular system or other alternate system. For example, the disparity can occur as the distance between the mobile unit and a base station of the macro-cellular system can be several kilometers, or more. The signals generated by a micro-cellular system are also received by a mobile unit operated in a macro-cellular system. When the mobile unit is positioned proximate to a micro-cellular system, the mobile unit can react to the signal and request a hand-off to the micro-cellular system. In some instances, this is not desirable. For instance, the mobile unit may attempt to be handed off from the macro-cellular or other alternate system to the micro-cellular system when received control signals of the micro-cellular system are of significantly higher energy levels than control signals of the macro-cellular or other alternate system.

In one embodiment of the present invention, the times in which the mobile unit can be handed off from a macro-cellular or other alternate system to a micro-cellular system is controlled. A hand-off is prevented when the mobile unit is merely positioned proximate to a micro-cellular system, and is permitted only when the mobile unit enters the area encompassed by the micro-cellular system as defined by selected entrance or exit ways.

Because the RADs 3 are fixedly-positioned, the RADs 3 located proximate to exit ways or entrance ways to the indoor area are discernable. Mobile stations in communication with such RADs are thereby also discernable.

In one embodiment of the present invention, when a mobile unit is positioned proximate to an entrance way or exit way, as determined by reception of signals transmitted by the mobile unit to RADs 3 positioned proximate to such entrance way or exit way, the HUB 2 generates signals on a control, or other, channel to instruct the mobile station to communicate in the micro-cellular system.

In a further embodiment of the present invention, a mobile unit operable both in a micro-cellular environment and in a macro-cellular environment, such as the above-described system, further includes features to prolong the mobile unit's portable power supply. When a mobile unit is operable in a conventional, macro-cellular environment, substantial supervisory and control, i.e., overhead, functions are required to be performed. Fewer of such functions are required to be performed when the mobile unit is utilized in a micro-cellular environment. As such additional features need not be performed when the mobile unit is utilized in a micro-cellular environment, performance of such additional overhead functions is superfluous. Therefore, when the mobile unit is utilized in a micro-cellular environment, in addition to the reduction in power of communication signals generated by the mobile unit to the RADs 3, execution of some of the overhead functions can be eliminated. Increases in the battery life of a portable power supply used to power the mobile unit can therefore result.

While the present invention has been described with respect to a particular embodiment, those skilled in the art will recognize that the present invention is not limited to the specific embodiments described and illustrated herein. Different embodiments and adaptions besides those shown and described as well as many variations, modification and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed:

1. A communication network for permitting wireless communication with a mobile unit movably positionable to a selected location within at least one cell defined by an area encompassed by said network, said communication network comprising:

a plurality of spaced-apart transceivers, each of said transceivers respectively defining a subcell, said subcells collectively forming the at least one cell, said transceivers for selectively transmitting downlink signals to the mobile unit; and a control device coupled to each of said transceivers for controlling operation of said transceivers such that a first said transceiver defining the subcell in which the mobile unit is positioned and a second said transceiver defining a subcell adjacent thereto concurrently transmit a downlink signal on a selected downlink channel to the mobile unit and such that the mobile unit is permitted uninterrupted reception of the downlink signal by remaining tuned to the selected downlink channel as the mobile unit is moved between the adjacent subcells and such that uplink signals transmitted by the mobile unit in response to downlink signals transmitted by a transmitter portion of one said transceiver are permitted to be routed through a receiver portion of another said transceiver regardless of whether said another transceiver transmitted the downlink signals to which the mobile unit is responding.

2. The communication network of claim 1 wherein the mobile unit is operable to transmit said uplink signals on a selected uplink channel of a set of uplink channels and wherein said transceivers are each tuned concurrently to all of the uplink channels of the set of uplink channels.

3. The communication network of claim 2 wherein said transceivers are operative to down-convert the uplink signals received by said transceivers to form first down-converted signals, and wherein the first down-converted signals formed by said transceivers are supplied to said control device.

4. The communication network of claim 3 wherein said control device further demodulates at least one of the first down-converted signals supplied thereto.

5. The communication network of claim 4 wherein said control device further selects which of the first-down converted signals supplied thereto are demodulated.

6. The communication network of claim 3 wherein said control device selects said first and second transceivers to transmit the downlink signal responsive, at least in part, to characteristics of uplink signals received at the transceivers.

7. The communication network of claim 6 wherein the characteristics of the uplink signals utilized by said control device comprises signal quality characteristics.

8. The communication network of claim 7 wherein the characteristics of the uplink signals utilized by said control device comprises at least energy levels of the uplink signals received at the transceivers.

9. The communication network of claim 2, wherein said transceivers each comprise a plurality of down-converters, said plurality of down-converters of each transceiver for down-converting uplink signals received on any of the uplink channels.

10. The communication network of claim 9 wherein said transceivers each comprise a plurality of up-converters and wherein said control device controls the operation of the transceivers by controlling selection of which of said transceivers and which of said up-converters thereof are utilized to form the downlink signals.

11. The communication network of claim 1 wherein said transceivers comprise antenna devices.

12. The communication network of claim 1 wherein at least two of said plurality of transceivers further simulcast a control signal on a control channel to the mobile unit.

13. The communication network of claim 12 wherein each of said plurality of transceivers simulcasts the control signal on the control channel to the mobile unit.

14. The communication network of claim 1 wherein said control device is further operative to assign identifiers to said transceivers.

15. The communication network of claim 14 wherein said plurality of spaced-apart transceivers includes at least one subsequently-added transceiver, said subsequently-added transceiver coupled to said control device subsequent to coupling of others of said plurality of transceivers to said control device, said subsequently-added transceiver operative to transmit to said control device indications of coupling of said subsequently-added transceiver to the control device, and wherein said control device assigns an identifier to said subsequently-added transceiver responsive to reception of the indications transmitted thereto by said subsequently-added transceiver.

16. The communication network of claim 14 wherein said transceivers are further operative to transmit authentication information to said control device and wherein said control device assigns identifiers to said transceivers by polling said transceivers and receiving the authentication information responsive thereto.

17. The communication network of claim 1 further comprising a bi-directional interface link for coupling said control device together with said transceivers.

18. The communication network of claim 1 wherein said cell defined by the area encompassed by said network overlaps with an alternate area of an alternate network having an alternate network mobile device moveably-positionable therein and capable of communication with both a transceiver of said plurality of spaced-apart transceivers and with a base station of the alternate network, and wherein said control device is further operative to control times in which the alternate network mobile device is permitted to communicate with at least one transceiver of said plurality of spaced-apart transceivers when the alternate network mobile device is being operated to communicate with the base station of the alternate network.

19. The communication network of claim 18 wherein the alternate network mobile device is permitted to communicate with at least one transceiver of the plurality of spaced-apart transceivers when the alternate network mobile device is positioned proximate to the selected transceiver.

20. A method for permitting wireless communication in a communication network with a mobile unit movably positionable to a selected location within at least one cell defined by an area encompassed by the network, said method comprising the steps of:

positioning a plurality of transceivers at spaced-apart locations throughout the at least one cell, each of the transceivers defining a subcell;

from a transceiver defining the subcell in which the mobile unit is positioned and from a transceiver defining a subcell adjacent thereto, concurrently transmitting a downlink signal on a selected downlink channel to the mobile unit such that the mobile unit is permitted uninterrupted reception of the downlink signal by remaining tuned to the selected downlink channel as the mobile unit is moved between the adjacent subcells; and transmitting an uplink signal from the mobile unit in response to a downlink signal received from one of the transceivers, and routing the uplink signal through another of the transceivers regardless of whether said another transceiver transmitted the downlink signal to which the mobile unit is responding.

21. The method of claim 20 comprising the further steps of:

tuning the transceivers concurrently to every uplink channel of a set of uplink channels;

transmitting an uplink signal from the mobile unit upon a selected uplink channel of the set of uplink channels; and receiving the uplink signal at transceivers of the plurality of transceivers within range of the mobile unit.

22. The method of claim 20 comprising the additional steps of:
- transmitting polling requests to each transceiver requesting information regarding each transceiver;
- receiving responses from each of the transceivers responsive to the polling requests; and
- controlling communication with the mobile unit based in part upon the received responses.

23. The method of claim 22 further for adaptively configuring the network when an additional transceiver is installed therein, said method comprising the additional steps of:
- transmitting signals from the additional transceiver to a control device to prompt the control device to poll the additional transceiver;
- transmitting a polling request from the control device to the additional transceiver requesting additional information regarding the additional transceiver;
- transmitting responses from the additional transceiver back to the control device responsive to the polling request; and
- permitting the additional transceiver to form a portion of the network when the responses transmitted back to the control device are of selected values.

24. A communication network for permitting wireless communication with a mobile unit movably positionable to a selected location within at least one cell defined by an area encompassed by said network, said communication network comprising:
- a plurality of spaced-apart transceivers respectively defining a plurality of subcells which collectively form the at least one cell, each of said transceivers having a transmitter portion and a receiver portion, said transmitter portions for selectively transmitting downlink signals on a selected downlink channel to the mobile unit tuned to the selected downlink channel, and each of said receiver portions tuned concurrently to every uplink channel of a set of uplink channels for receiving an uplink signal transmitted by the mobile unit on a selected uplink channel of the set of uplink channels; and
- a control device coupled to each of said transceivers, said control device for controlling operation of said transceivers such that one said transceiver defining the subcell in which the mobile unit is located and another said transceiver defining an adjacent subcell concurrently transmit a downlink signal on the selected downlink channel.

25. The network of claim 24, wherein said control device controls operation of said transceivers such that uplink signals transmitted by the mobile unit in response to downlink signals transmitted by said transmitter portion of one said transceiver are permitted to be routed through said receiver portion of another said transceiver regardless of whether said another transceiver transmitted the downlink signals to which the mobile unit is responding.

26. A cellular telephone system having at least one cell defined in a specific geographic region, said system comprising:
- a plurality of radio transceivers positioned throughout the at least one cell, each said radio transceiver for providing radio coverage within a portion of the cell, each portion defining a subcell of the at least one cell, the plurality of radio transceivers operable to broadcast a first information signal upon a common channel throughout each of the subcells defined by said plurality of radio transceivers, a first said radio transceiver and a second said radio transceiver adjacent thereto operable to broadcast a second information signal upon a selected channel throughout a first said subcell and a second said subcell respectively defined by the first radio transceiver and the second radio transceiver;
- a mobile station operable to receive the first information signal when positioned within any of the subcells and operable to receive the second information signal when positioned within said first and second subcells, said mobile station responsive to a third information signal received from one of said radio transceivers for transmitting a fourth information signal to at least one of said radio transceivers; and
- a controller coupled to said radio transceivers for permitting said fourth information signal to be routed through a further one of said radio transceivers other than said radio transceiver from which said third information signal was received regardless of whether said further radio transceiver transmitted said third information signal.

27. The cellular telephone system of claim 26 wherein the second information signal broadcast from the first radio transceiver is transmitted at a time offset relative to broadcast of the second information signal from the second radio transceiver, thereby to provide time dispersion.

* * * * *